United States Patent
Bolash et al.

[11] Patent Number: 6,068,366
[45] Date of Patent: *May 30, 2000

[54] METHOD OF PRINTING WITH AN INK JET PRINTER TO INHIBIT THE FORMATION OF A PRINT ARTIFACT

[75] Inventors: John Philip Bolash; Edmund Holin James, III, both of Lexington, Ky.

[73] Assignee: Lexmark International, Inc., Lexington, Ky.

[*] Notice: This patent is subject to a terminal disclaimer.

[21] Appl. No.: 09/309,369

[22] Filed: May 11, 1999

Related U.S. Application Data

[63] Continuation of application No. 08/818,055, Mar. 14, 1997, Pat. No. 5,940,093.

[51] Int. Cl.$^7$ .................................. B41J 2/21; B41J 29/38
[52] U.S. Cl. .................................. 347/43; 347/16
[58] Field of Search .................. 347/43, 40, 16, 347/104, 105; 346/134; 400/279

[56] References Cited

U.S. PATENT DOCUMENTS

| | | | |
|---|---|---|---|
| 5,684,517 | 11/1997 | Clemente et al. | 347/43 |
| 5,751,312 | 5/1998 | Gibson | 347/43 |
| 5,940,093 | 8/1999 | Bolash et al. | 347/16 |

*Primary Examiner*—N. Le
*Assistant Examiner*—Thinh Nguyen
*Attorney, Agent, or Firm*—Michael T. Sanderson

[57] ABSTRACT

The invention is directed to a method of printing on a print medium wherein a relocation error is induced in a paper transport system so as to randomize, bias, or redistribute harmonic errors associated with the paper transport system. The print medium is advanced in the ink jet printer in an advance direction to a registration location using the paper transport system. A first subset of an addressable set of ink emitting orifices in the printhead are used to print on the print medium at the registration location. The print medium is then moved in a reverse direction a predetermined distance. The print medium is again advanced in the advance direction and relocated at the registration location using the paper transport system. A second subset of the addressable set of ink emitting orifices in the printhead are used to print on the relocated print medium at the registration location.

22 Claims, 3 Drawing Sheets

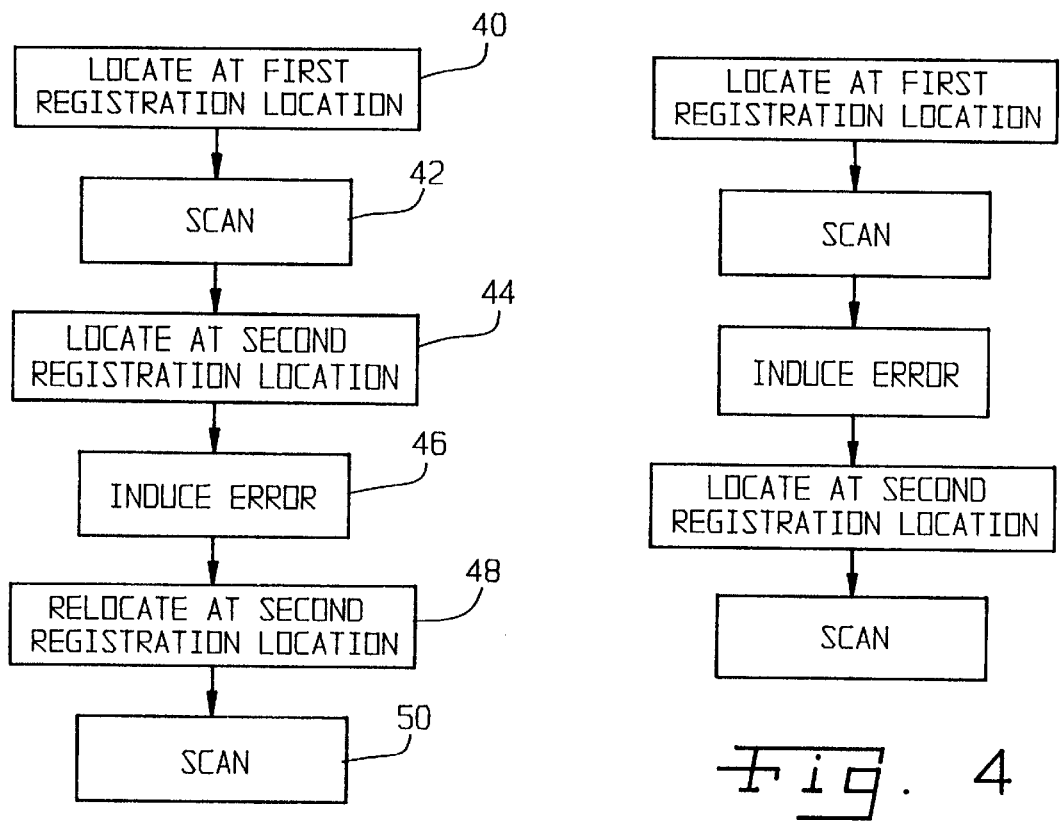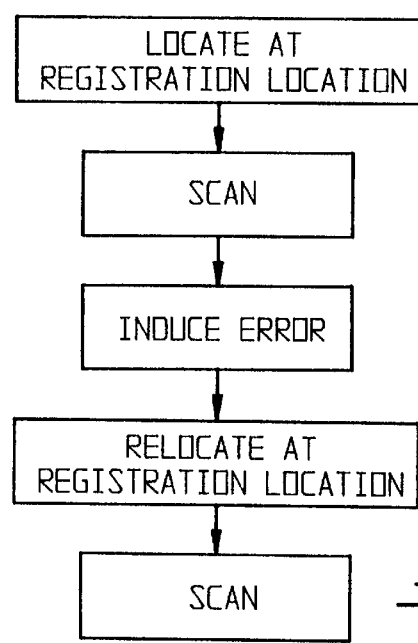

ized set of ink emitting orifices in the printhead are used to print on the print medium at a first location. The print medium is then moved in a reverse direction a predetermined distance. The print medium is again advanced in the advance direction and relocated at a second location using the print medium transport system. A second subset of the addressable set of ink emitting orifices in said printhead are used to print on the relocated print medium at the registration location.

An advantage of the present invention is that print artifacts caused by harmonic errors in the print medium transport system are inhibited.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a flowchart illustrating one embodiment of the method of the present invention;

FIG. 4 is a flowchart illustrating another embodiment of the method of the present invention; and FIG. 5 is a flowchart illustrating yet another embodiment of the method of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
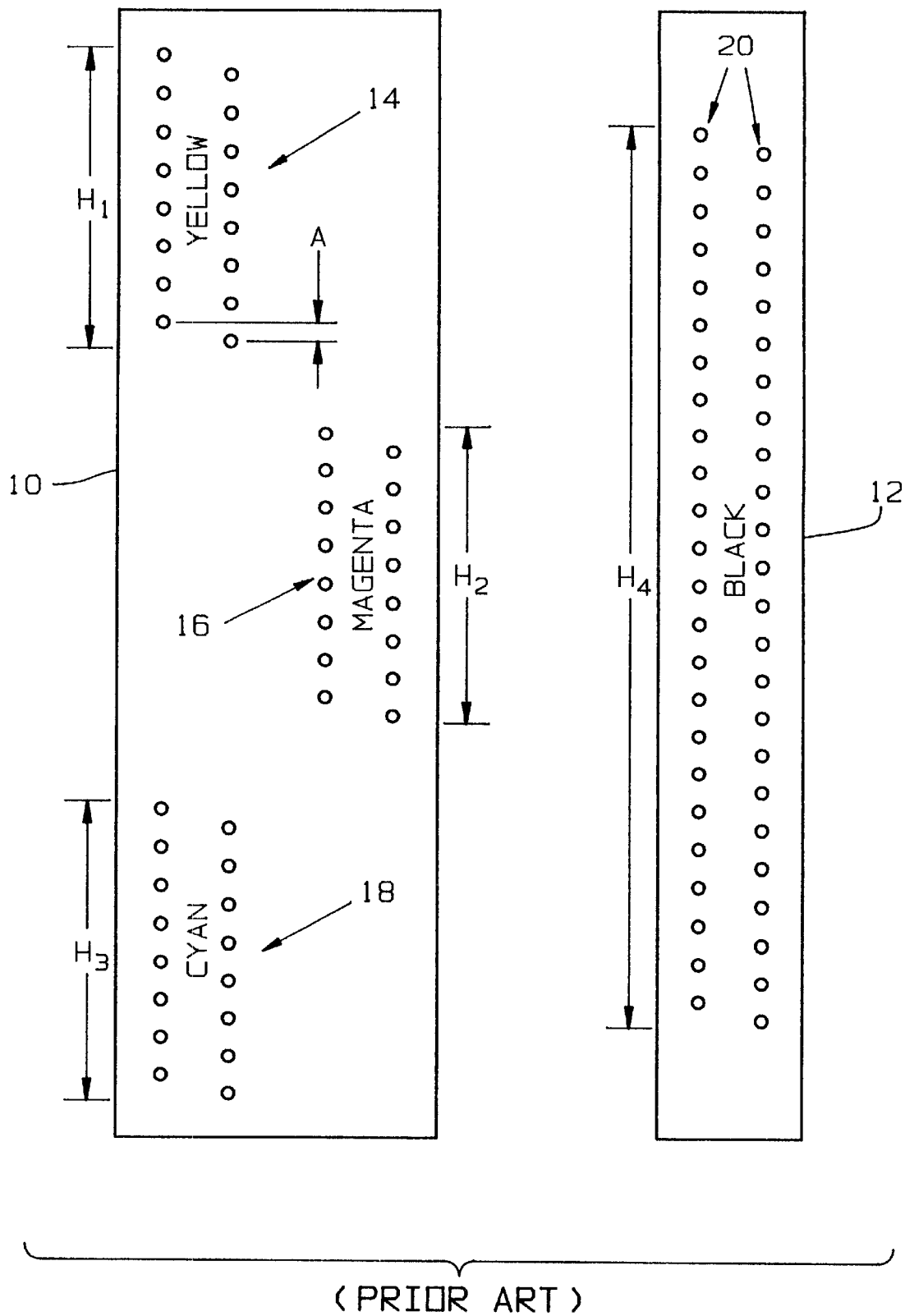
FIG. 1 is a diagrammatic view of a tri-color cartridge having cyan, magenta and yellow orifices and a black cartridge having black orifices, which may be used with the method of the present invention.

Referring now to FIG. 1, an example of a conventional print cartridge which may be used with the method of the present invention is described in greater detail. A color cartridge 10 and black cartridge 12 are carried by a movable carriage (not shown). Color cartridge 10 includes a tri-color printhead defined by a plurality of orifices 14, 16 and 18 for depositing three respective colors of ink on a print medium, such as paper. Orifices 14 define a first array of orifices having a height $H_1$, from which a yellow ink may be jetted onto the print medium. Orifices 16 define a second array of orifices having a height $H_2$, from which a magenta ink may be jetted onto the print medium. Orifices 18 define a third array of orifices having a height $H_3$, from which a cyan ink may be jetted onto the print medium. Color cartridge 10 is therefore capable of jetting three primary color inks onto the print medium using yellow orifices 14, magenta orifices 16 and cyan orifices 18.

In the particular embodiment shown, yellow orifices 14, magenta orifices 16 and cyan orifices 18 each include sixteen (16) orifices, with each array of orifices being disposed in two vertical rows of eight (8) orifices. A distance "A" exists between vertically adjacent orifices 14, 16, and 18. Yellow orifices 14, magenta orifices 16 and cyan orifices 18 are incorporated into a one-piece cartridge in the embodiment shown. It should be appreciated, however, that color cartridge 10 may be constructed as a multiple-piece cartridge, such as a three-piece color cartridge corresponding to each of the color orifices 14, 16 and 18.

Black cartridge 12 includes a black printhead defined by a plurality of orifices 20 defining an array of orifices having a height $H_4$. Orifices 20 are configured to jet a single color ink, namely black ink, on the print medium.

Figure 2:
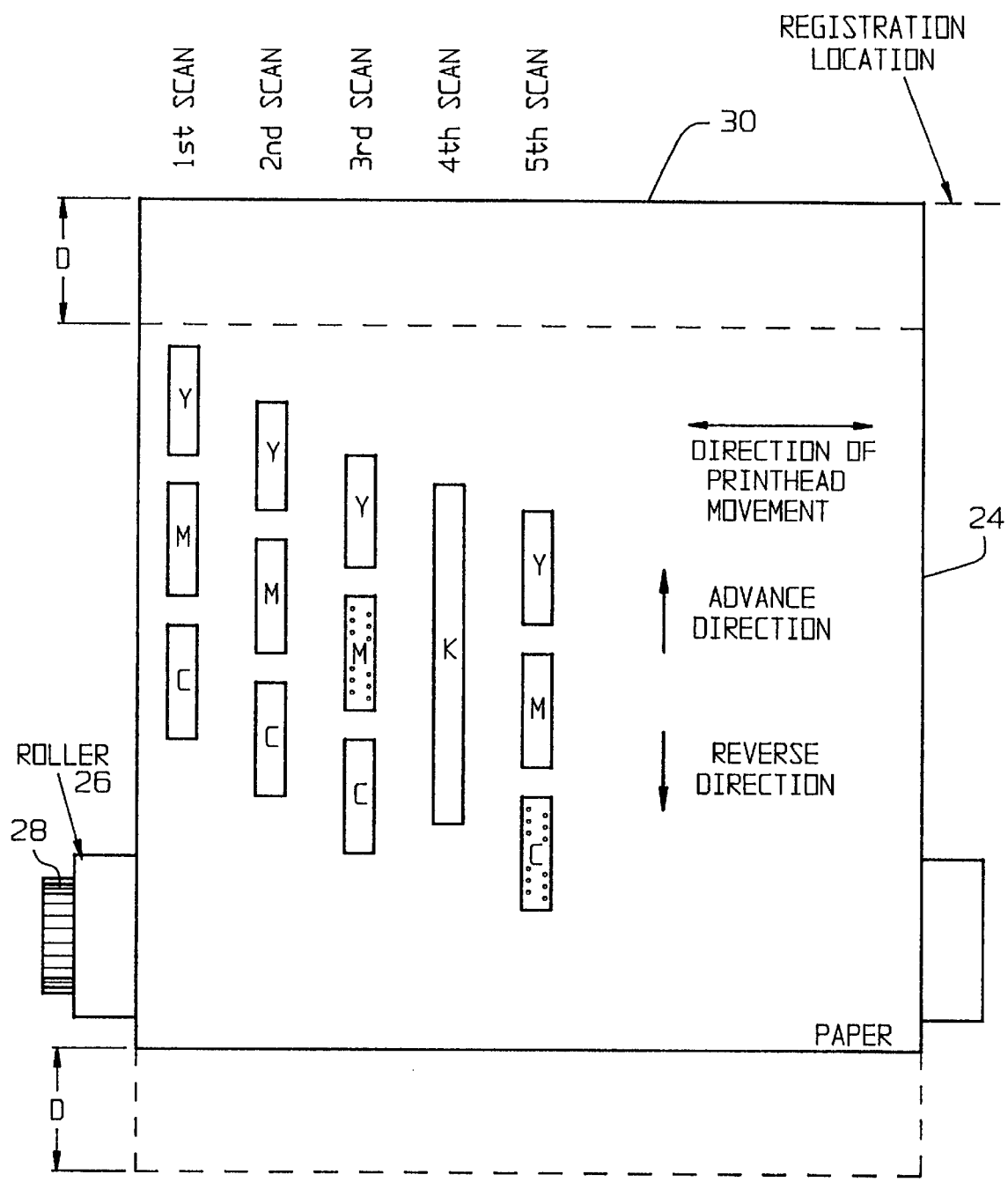
FIG. 2 illustrates an embodiment of a method of printing of the present invention for reducing print artifacts associated with harmonic errors of the paper transport system, using the printhead of FIG. 1 during interlaced printing with 50% shingling (2-pass) for color and black.

Referring now to FIG. 2, an embodiment of the method of printing of the present invention for reducing print artifacts associated with harmonic errors of a paper transport system will be described. In the embodiment shown in FIG. 2, the method of the present invention is carried out using color cartridge 10 and black cartridge 12 shown in FIG. 1, during interlaced printing with 50% shingling (2-pass) for color and black.

Paper 24 is moved through the ink jet printer using a paper transport system defined in part by a roller 26. Roller 26 frictionally engages paper 24. Roller 26 includes a gear 28 which is attached to or integral with an end thereof. Gear 28 includes a plurality of teeth around the circumference thereof which enmesh with teeth on adjacent gears (not shown) in the paper transport system. Rotation of the rollers within the paper transport system, such as roller 26, causes paper 24 to move in the advance direction indicated in FIG. 2.

Roller 26 is also used to align paper 24 at a registration location allowing color cartridge 10 and black cartridge 12 to be aligned relative to and scanned across a plurality of rasters. In the embodiment shown in FIG. 2, the registration location is arbitrarily selected as corresponding to a leading edge 30 of paper 24. That is, the distance between leading edge 30 of paper 24 and a particular raster may be determined for accurately locating color cartridge 10 and black cartridge 12 relative to the particular raster. However, the registration location can be selected to correspond to any location in the advance direction on paper 24. To wit, leading edge 30 of paper 24 may be detected with appropriate sensors and the number of steps associated with a stepper motor used to drive roller 26 may be determined to locate any arbitrarily chosen registration location on paper 24.

A conventional 50% shingling method (with reference to FIG. 2, but disregarding the method of the present invention) involves scanning the color cartridge and placing 50% of the color dots (first pass), moving the paper a distance of 8 orifices (8 * distance A in FIG. 1), scanning the color cartridge and placing 50% of the color dots (second pass), moving the paper a distance of 8 orifices, scanning the color cartridge and placing 50% of the color dots (third pass), moving the paper a distance of 8 orifices, scanning the black cartridge placing 50% of the black dots (fourth pass), not moving the paper, and repeating this sequence (fifth pass, etc.) until the entire document has been printed. A 50% shingling technique as shown in FIG. 2 has the advantage of reducing the objectionable color/black banding artifact previously described. Since only part of the dots are placed on a given pass, some of the dots are given time to dry into the paper prior to additional dots being placed. Other levels of shingling are also possible, for example 25% shingling (4-pass shingling) where approximately 25% of the dots are placed on any given scan of the cartridges.

According to the method of the present invention, paper 24 is moved from an initial registration location in a reverse direction between scans of color cartridge 10 and black cartridge 12 a distance which is sufficient to induce a relocation error as a result of a relocation of paper 24 nominally at the initial registration location, but actually to a second registration location. Thus, the second registration location corresponds to the initial registration location plus or minus the distance associated with the relocation error. This relocation error may be induced in either a random or synchronous manner with respect to the harmonic error associated with the paper transport system. The reverse direction of movement of paper 24 is parallel to but opposite from the advance direction. Between each of the first through the fifth scans shown in FIG. 2, paper 24 is moved in the reverse direction a predetermined distance "D" which is sufficient to cause a relocation error in the drive train of the paper transport system, such as a displacement error associated with the rotational movement of gear 28 of roller 26. The predetermined distance "D" represents the distance which paper 24 is moved in the reverse direction to cause an error in the paper transport system. In the particular embodiment described herein, the predetermined distance "D" is actually more than the distance "A" (FIG. 1) between vertically adjacent pixels. However, in some embodiments, the distance "D" may be equal to or less than "A". Thus, for example, a preferred range of the distance "D" may be between ⅓ to six times the distance "A". In the particular embodiment of FIG. 1, the distance "D" is preferably between about two to three times the distance "A". The distance "D" can nonetheless be any predetermined distance which effects a relocation error to randomize, or bias, the harmonic disturbances in the paper transport system. For example, the harmonic error may be randomized by varying the distance "D" from one inducement of relocation error to the next, or the harmonic error may be biased, or redistributed, by selecting a fixed value for the distance "D". The predetermined distance "D" is shown exaggerated in FIG. 2 for purposes of illustration and clarity.

When carrying out a 50% shingling method as shown in FIG. 2 in conjunction with the method of the present invention, color cartridge 10 is aligned with a first registration location and scanned across paper 24 to selectively deposit ink onto paper 24 from yellow orifices "Y", magenta orifices "M" and cyan orifices "C" (shown in flow chart form in blocks 40 and 42 in FIG. 3). Upon completion of the first scan, paper 24 is advanced a distance corresponding to eight vertically adjacent orifices and aligned with a second registration location (block 44). When the registration location corresponds to leading edge 30 of paper 24, yellow orifices "Y" will thus be disposed a further distance away from leading edge 30 at the second registration location. When positioned at the second registration location, paper 24 is then moved in the reverse direction a predetermined distance "D" causing a relocation error in the paper transport system (block 46), and thereafter moved in the advance direction back to the second registration location (block 48). Color cartridge 10 is then scanned across paper 24 (block 50). Because the second registration location is not aligned relative to the first registration location as a result of the induced relocation error, print artifacts such as rainbow effects in color samples and gray scale darkness shifts in monochrome samples are avoided. The printing process of scanning color cartridge 10 or black cartridge 12, advancing paper 24 to a next registration location, moving paper 24 in a reverse direction to induce a relocation error in the paper transport system, relocating paper 24 at the next registration location with the induced relocation error and printing on paper 24 at the next registration location is repeated until the entire print image is printed on paper 24.

In the embodiment of the method of the present invention described above, the predetermined distance "D" is more than the distance "A" between vertically adjacent orifices in color cartridge 10 or black cartridge 12 and preferably is about two to three times the distance "A". However, the predetermined distance "D" may vary depending upon the manufacturing tolerances of the various components in the paper transport system. The predetermined distance "D" may be relatively easily determined using empirical testing to establish what predetermined distance "D" is required to avoid the formation of print artifacts associated with harmonic errors in the paper transport system.

Additionally, in the embodiment described above, paper 24 is moved in the reverse direction an amount which is sufficient to induce a relocation error in the paper transport system. It is also to be understood, however, that paper 24 may be moved in the advance direction as long as a relocation error is likewise induced in the paper transport system prior to locating or relocating paper 24 at a particular registration location.

Moreover, in the embodiment shown in FIG. 2 and described above, paper 24 is moved in the reverse direction after color cartridge 10 and black cartridge 12 are located relative to a particular scan of the printhead, and before the scan actually occurs. However, it is also possible to scan the printhead, move paper 24 in the reverse direction an amount sufficient to induce a relocation error in the paper transport system, advance paper 24 in the advance direction to the next registration location and then scan the printhead for the next scan. That is, the relocation error may be induced into the paper transport system prior to moving the paper to the next registration location, rather than after the paper is located at the next registration location (FIG. 4).

Additionally, the method of the present invention is described above with reference to and in conjunction with a shingling algorithm. However, the method of printing of the present invention may also be carried out using a conventional printing technique without shingling. That is, paper 24 may be advanced in the advance direction between scans of color cartridge 10 a distance corresponding to the height of yellow orifices "Y", magenta orifices "M" or cyan orifices "C". A relocation error associated with the paper transport system is induced into the registration location for each scan of color cartridge 10 and/or black cartridge 12. The relocation error may be induced into the registration location either immediately before or immediately after the paper is located at the particular registration location, or may also be induced immediately after a particular scan and before the paper is moved to the next registration location.

Furthermore, when the method of the present invention is utilized in conjunction with a non-shingled printing technique, the first registration location and the second registration location occurring before and after movement of the paper to induce a relocation error may in fact coincide or be the same registration location. To wit, a color cartridge 10 as shown in FIG. 1 may be scanned across paper 24 and only one-half of the ink dots placed on paper 24 during the scan. Paper 24 may then be moved in a reverse direction to induce a relocation error and relocated at the same registration location. Color cartridge 10 may then be scanned a second time across paper 24 to deposit the remaining ink dots on paper 24 (FIG. 5). It will be appreciated, however, that an induced relocation error is associated with each separate scan of color cartridge 10.

It is to be understood, and it will be appreciated by those skilled in the art, that the methodology and logic of the present invention described above may be carried out using any number of structural configurations such as electronic hardware, software, and/or firmware, or the like.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing on a print medium using a printhead in an ink jet printer, said method comprising the steps of:

printing on the print medium at a first location using a first addressable set of ink emitting orifices in said printhead;

in the presence of a harmonic error in said print medium transport system, moving the print medium in a reverse direction using a print medium transport system a predetermined distance associated with said harmonic error in said print medium transport system;

advancing the print medium in an advance direction using said print medium transport system; and printing on the relocated print medium at a second location using a second addressable set of ink emitting orifices in said printhead, said second addressable set of ink emitting orifices being different than said first addressable set of ink emitting orifices.

2. The method of printing of claim 1, wherein said predetermined distance comprises a distance which is sufficient to induce a relocation error in said print medium transport system.

3. The method of printing of claim 2, wherein said relocation error is associated with at least one gear in said print medium transport system.

4. The method of claim 1, further comprising the step advancing the print medium prior to performing said moving step.

5. The method of claim 1, wherein said second location corresponds to the first location plus or minus a distance associated with a relocation error induced by said print medium transport system.

6. The method of claim 1, wherein said first location is a first registration location and said second location is a second registration location.

7. The method of printing of claim 6, wherein said first registration location is different from said second registration location.

8. The method of printing of claim 1, wherein said first and second printing steps comprise the substeps of scanning the printhead across the print medium in a direction transverse to said advance direction.

9. The method of printing of claim 1, wherein said moving step occurs after a second advancing of the print medium using said print medium transport system.

10. The method of printing of claim 1, wherein said first addressable set of ink emitting orifices is the same as said second set of ink emitting orifices.

11. The method according to claim 1, wherein said harmonic error occurs with a frequency substantially equal to a rotational frequency of at least one gear in said print medium transport system.

12. The method according to claim 11, comprising the further step of cyclically repeating said moving step with a frequency dependent upon said rotational frequency of said at least one gear in said print medium transport system.

13. A method of printing on a print medium using a printhead in an ink jet printer, said method comprising the steps of:

advancing the print medium in said ink jet printer in an advance direction to a first registration location using a print medium transport system, said first registration location including a harmonic error caused by said print medium transport system;

printing on the print medium at said first registration location using a first addressable set of ink emitting orifices in said printhead;

moving the print medium in a direction parallel to said advance direction a distance which is sufficient to cause a relocation error in said print medium transport system, said relocation error at least partially offsetting said harmonic error caused by said print medium transport system;

locating the print medium at a second registration location using said print medium transport system; and printing on the located print medium at said second registration location using a second addressable set of ink emitting orifices in said printhead, said second addressable set of ink emitting orifices being different than said first addressable set of ink emitting orifices.

14. The method of printing of claim 13, wherein said moving step comprises moving the print medium in a reverse direction a predetermined distance.

15. The method of printing of claim 13, wherein said first and second printing steps comprise the substeps of scanning the printhead across the print medium in a direction transverse to said advance direction.

16. The method of printing of claim 13, wherein said first registration location is different from said second registration location.

17. The method of printing of claim 13, wherein said moving step occurs after said locating step.

18. The method of printing of claim 13, wherein said first addressable set of ink emitting orifices is the same as said second set of ink emitting orifices.

19. The method of claim 13, wherein said distance is a variable distance.

20. The method of printing of claim 13, wherein said relocation error is induced to randomize or redistribute harmonic error in said print medium transport system.

21. The method of printing of claim 20, wherein said relocation error is associated with at least one gear in said print medium transport system.

22. A method of printing on a print medium using a printhead in an ink jet printer, said method comprising the steps of:

advancing the print medium in said ink jet printer in an advance direction to a first registration location using a print medium transport system;

printing on the print medium at said first registration location;

advancing the print medium again in said advance direction and locating the print medium at a second registration location using said print medium transport system;

moving the print medium in a first direction parallel to said advance direction;

moving the print medium in a second direction opposite to said first direction to thereby locate the print medium at a randomized second registration location; and printing on the relocated print medium at said randomized second registration location.

* * * * *